United States Patent Office 3,074,925
Patented Jan. 22, 1963

3,074,925
AZO ANTHRAQUINONE DYESTUFFS CONTAINING A TRIAZINE
Robert Norman Heslop, Blackley, Manchester, England, assignor to Imperial Chemical Industries Limited, London, England, a corporation of Great Britain
No Drawing. Filed June 4, 1959, Ser. No. 817,981
Claims priority, application Great Britain Nov. 29, 1954
6 Claims. (Cl. 260—153)

This application is a continuation-in-part of application Serial No. 549,176, filed in the United States Patent Office on November 25, 1955; and of application Serial No. 732,841, filed May 8, 1958, as a continuation-in-part of application Serial No. 549,160, filed November 25, 1955, now abandoned, which application Serial No. 732,841, is now United States Patent 2,892,670, having issued June 30, 1959.

The present invention is concerned with water-soluble dyestuffs of the triazine series. More particularly the invention is concerned with water-soluble dyestuffs of the triazine series which contain both an azo chromophore and an anthraquinone chromophore.

It is well-known, for example, from British Patents Nos. 466,886 and 554,463, that water-soluble dyestuffs of the triazine series may be obtained which contain both an azo chromophore and an anthraquinone chromophore. In the dyestuffs hitherto described, this has been achieved by condensing an α-aminoanthraquinone compound which contains a reactive amino group and an amino-azodyestuff containing a reactive amino group with a cyanuric halide, and usually replacing the final halogen atom of the cyanuric halide by reaction with an amine, e.g. aniline.

We have now found that valuable dyestuffs may be obtained by condensing cyanuric chloride with certain water-soluble amino compounds which contain both the anthraquinone and the azo chromophore in such manner that two chlorine atoms are left attached to the carbon atoms of the triazine ring. The dyestuffs forming the subject of the invention may be broadly represented, in the acid form, by the formula:

wherein $n$ stands for 0 or 1 and A stands for a radical of the azobenzene series which contains at least one strongly acid water-solubilising group, for example, a sulphonic acid group or a carboxylic acid group. In general A will not contain more than two such groups.

The dyestuffs so defined have a similarity of dyeing properties as hereinafter set out which are determined by these broad structural features and which are little affected by the variations of structure possible within these definitions, or by the presence or absence of non-solubilizing groups in A.

Thus, the nitrogen atoms linking the azobenzene radical A to the anthraquinone and triazine nuclei may be attached to the same or different benzene nuclei, so that A may represent such radicals as for example:

and which radicals contain at least one strongly acid solubilising group. The benzene nuclei in A may also contain other substituents, especially chlorine atoms, lower alkyl groups or lower alkoxy groups, e.g. methyl, methoxy and ethoxy groups, without markedly affecting the general properties of the dyestuffs.

The new dyestuffs may be obtained by the condensation of cyanuric chloride with about one molecular proportion of an amino-azoanthraquinone compound which is represented in the acid form by the formula:

in which A and $n$ have the meanings given above. The said aminoazo anthraquinone compounds used in this manner are mainly novel but may be obtained by general methods in themselves known from the past, for example, by condensing a diaminoazobenzene which contains a strongly acid water-solubilising group with a 4-bromo-1-amino-anthraquinone-2-sulphonic acid or a 5-, 6-, 7- or 8-sulphonic acid derivative thereof, or by coupling a diazotised aniline containing a strongly acid water-solubilising group with a 1-amino-4-(m-aminoanilino)anthraquinone-2-sulphonic acid or a 5-, 6-, 7- or 8-sulphonated derivative thereof analogously to the method described in German Patent No. 659,591.

The reaction of the said aminoanthraquinone compound with cyanuric chloride is preferably carried out in aqueous medium at a low temperature, preferably between 0 and 10° C. Advantageously the reaction medium is maintained at or about neutrality by the addition of acid-binding agents such as sodium carbonate during the reaction so as to neutralise the hydrochloric acid formed.

If desired, an excess of cyanuric chloride may be used to allow for hydrolysis.

The new dyestuffs so obtained can be isolated from the medium in which they are produced by the commonly-used methods, for example by salting out the dyestuff in the alkali-metal salt form and filtration or by spray-drying the whole reaction mixture. Owing to the presence of the labile chlorine atoms in the molecule it is desirable to carry out the drying cautiously, for example at a moderate temperature such as between 20° C. and 40° C. and, if desired, under reduced pressure. The addition of certain buffers aids the stabilisation of these labile chlorine atoms especially valuable being mixtures of alkali metal hydrogen phosphates and mixtures of the free acids and alkali metal salts of dialkylarylamine sulphonic acids (e.g. diethylmetanilic acid) in which the alkyl groups contain 2 or more carbon atoms.

The new dyestuffs are suitable for dyeing or printing a wide variety of material, for example wool, silk and polyamide materials, and are especially valuable for use on cellulose textile materials such as linen, viscose rayon and cotton when dyed in the presence of an alkali or when the dyed material is after-treated with an alkali. On these materials they give olive-green shades which are very fast to washing and to light. They are especially suitable for dyeing cellulose at or about room temperature in an aqueous alkaline both which contains a salt, and may also be fixed on cellulose by padding or textile printing methods incorporating a treatment with an alkali, and if desired, a short heat treatment.

The preferred dyestuffs of the invention are those in which A of the general formula represents a 4:4'-radical of the azobenzene series containing a sulphonic acid group or a carboxylic acid group, and above all are preferred those in which A represents a radical of the formula:

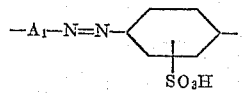

wherein $A_1$ stands for a 1:4-monocyclic radical of the benzene series.

The invention is illustrated but not limited by the following examples in which parts are by weight:

Example 1

A solution of 4.06 parts of cyanuric chloride in 20 parts of acetone is added gradually to a stirred mixture of 50 parts of water and 100 parts of crushed ice. To the stirred suspension of cyanuric chloride thus obtained there is added at 0° to 4° C. during 1 hour a solution in 250 parts of water of 14.8 parts of the trisodium salt of 1-amino-4-[4'-(4''-aminophenylazo)-aniline]-anthraquinone-2:2'':5-trisulphonic acid, which may be prepared by condensing 4-bromo-1-aminoanthraquinone-2:5-disulphonic acid with 4:4'-diaminoazobenzene-2-sulphonic acid in alkaline medium. The mixture is stirred for a further 40 minutes at 0°–4° C. and then sufficient 2 N sodium carbonate solution is added gradually during 30 minutes to render the reaction mixture neutral to litmus. A solution of 11.4 parts of disodium hydrogen phosphate and 7.2 parts of potassium dihydrogen phosphate in 100 parts of water is added, the mixture is stirred for 10 minutes and then sufficient sodium chloride to give a concentration of 50 grams per litre is added and the mixture is stirred for 3 hours when separation of the dyestuff is complete. The mixture is filtered, and the solid on the filter is washed with a solution of 25 parts of sodium chloride, 11.4 parts of disodium hydrogen phosphate and 7.2 parts of potassium dihydrogen phosphate in 500 parts of water, and finally dried at atmospheric temperature. The product so obtained has the formula:

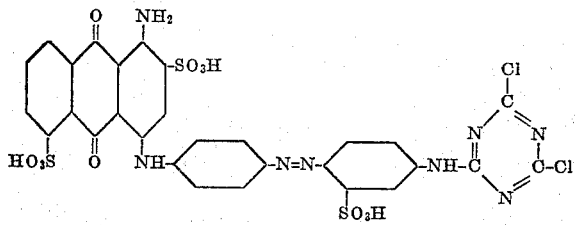

which yields olive-green shades on cotton and viscose.

By replacing the above trisodium salt of 1-amino-4-[4'-(4''-amino)phenylazo]anilinoanthraquinone-2:2'':5-trisulphonic acid with equal parts of the trisodium salt of 1-amino-4-[4'-(4''-amino)phenylazo]anilinoanthraquinone-2:3'':5-trisulphonic acid, a dyestuff almost identical in shade and properties is obtained. Also by substituting the above trisodium sulphonate with 14.1 parts of the trisodium salt of 1-amino-4-[4'-(4''-amino-3''-carboxy)phenylazo]anilinoanthraquinone-2:5-disulphonic acid a dyestuff very similar in shade and properties is obtained.

These dyestuffs have the formulae:

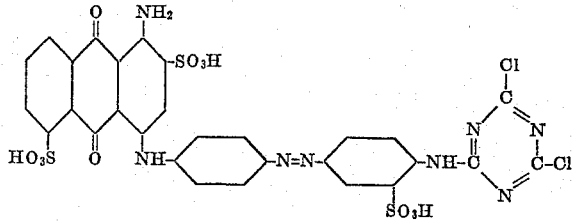

and

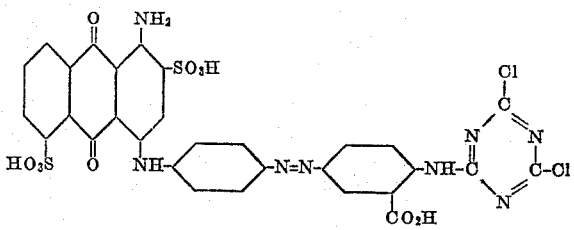

respectively.

In place of the trisodium salt of 1-amino-4-[4'-(4''-amino)phenylazo]anilinoanthraquinone-2:2'':5-trisulphonic acid used in the above example there is used an equal weight of 1-amino-4-[4'-(4''-amino)phenylazo]anilinoanthraquinone-2:2'':8-trisulphonic acid, a dyestuff of the formula:

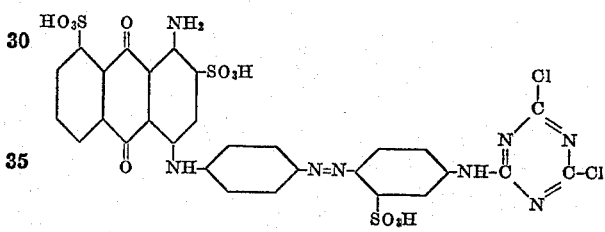

is obtained. It dyes in shades slightly bluer than the dyestuffs of the formulae indicated above.

Example 2

A solution of 0.93 part of cyanuric chloride in 16 parts of acetone is added gradually to 100 parts of water stirred at 0° to 2° C. To the stirred suspension of cyanuric chloride so obtained a solution of 3.37 parts of 1-amino-4-(3''-amino-4'-phenylazo)anilinoanthraquinone-2:2'':5''-trisulphonic acid in 200 parts of water is added during about 1 hour the temperature of the reaction mixture being maintained at 5° to 10° C. and the pH at between 5.5 and 6.5 by the addition of 2 N sodium carbonate solution. After stirring for one hour longer, a mixture of 0.5 part of disodium hydrogen phosphate and 1.0 part of potassium dihydrogen phosphate is added. When these have dissolved, the reaction mixture is filtered, sodium chloride is added to the filtrates and the dyestuff so precipitated is filtered and washed on the filter with a solution of 40 parts of sodium chloride, 1.35 parts of disodium hydrogen phosphate and 2.7 parts of potassium dihydrogen phosphate in 200 parts of water and finally dried at room-temperature. The dyestuff so obtained has the formula:

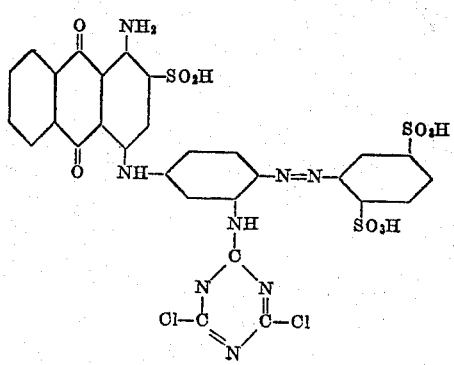

It possesses very good solubility in water and yields fast olive-green shades on cotton, bluer than the dyestuffs of Example 1.

*Example 3*

A solution of 1.94 parts of cyanuric chloride in 20 parts of acetone is added gradually to 80 parts of water stirred at 0° to 2° C. To the stirred suspension of cyanuric chloride so obtained a solution of 7.53 parts of the trisodium salt of 1-amino-4-[4'-(4''-aminophenylazo)-3'-methyl]anilinoanthraquinone-2:2'':5-trisulphonic acid in 200 parts of water is added during 30 minutes the temperature of the reaction mixture being maintained at less than 5° C. and the pH between 5 and 6 by the addition of 2 N sodium carbonate solution. After stirring for 30 minutes longer, sodium chloride is added and the dyestuff so precipitated is filtered off, washed on the filter with a solution of 4 parts of sodium chloride, 1.5 parts of disodium hydrogen phosphate and 3 parts of potassium dihydrogen phosphate in 200 parts of water and finally dried at room temperature. The dyestuff so obtained has the formula:

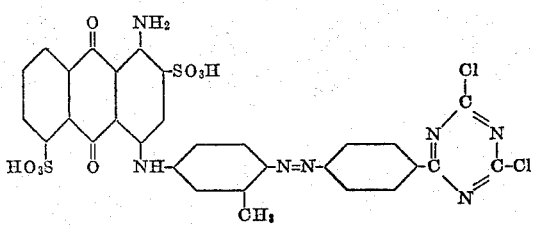

It has good solubility in water and yields fast olive green shades on cotton.

*Example 4*

A solution of 1.95 parts of cyanuric chloride in 20 parts of acetone is added gradually to 80 parts of water at 0° to 2° C. To the stirred suspension of cyanuric chloride so obtained a solution of 7.83 parts of the trisodium salt of 1-amino-4-[4'-(4''-aminophenylazo)-5'-methyl-2'-methoxy]anilinoanthraquinone-2:2'':5-trisulphonic acid in 200 parts of water and 30 parts of acetone is added during 30 minutes, the temperature of the reaction mixture being maintained at from 5° to 10° C. and the pH at between 5 and 6. After stirring for 30 minutes longer sodium chloride is added and the dyestuff so precipitated is filtered off washed on the filter with a solution of 4 parts of sodium chloride, 1.5 parts of disodium hydrogen phosphate and 3 parts of potassium dihydrogen phosphate in 200 parts of water and is finally dried at room temperature. The dyestuff so obtained has the formula:

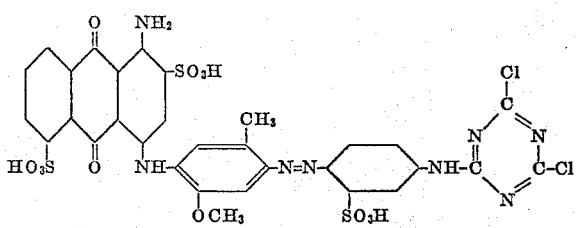

It posssesses good solubility in water and yields fast olive green shades on cotton.

By substituting 8.04 parts of the trisodium salt of 1-amino - 4 - [5' - chloro - 2' - methoxy - 4' - (4'' - amino)-phenylazo]anilinoanthraquinone-2:2'':5-trisulphonic acid for the trisodium salt of 1-amino-4-[4'-(4''-aminophenylazo) - 5' - methyl - 2' - methoxy]anilinoanthraquinone-2:2'':5-trisulphonic acid used in the above example, a similar dyestuff having the formula:

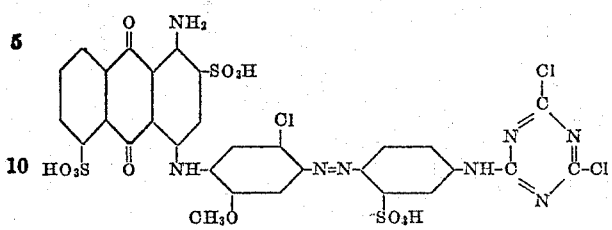

is obtained.

What I claim is:

1. The dyestuffs represented, in the acid form, by the formula:

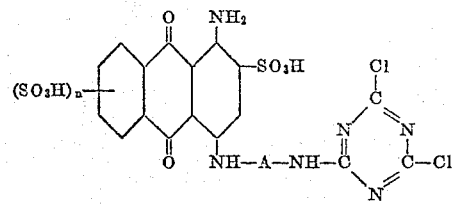

wherein *n* is 1 and A represents an azobenzene radical which contains from 1 to 2 strongly acid water-solubilising groups selected from the class consisting of sulfonic acid and carboxylic acid groups, the other substituents on the carbon atoms of A being selected from the group consisting of hydrogen, chlorine, lower alkyl and lower alkoxy.

2. The dyestuff of the formula:

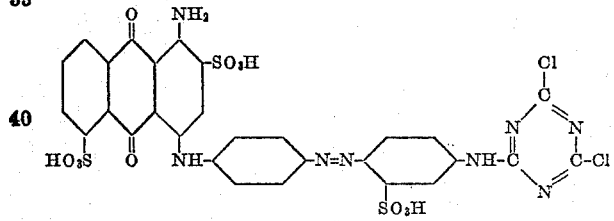

3. The dyestuff of the formula:

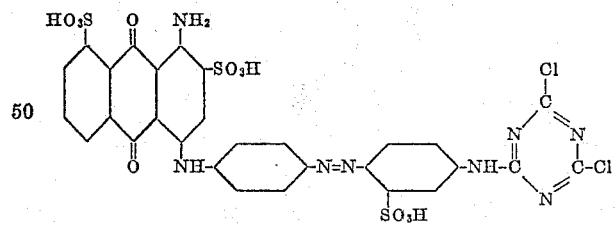

4. The dyestuff of the formula:

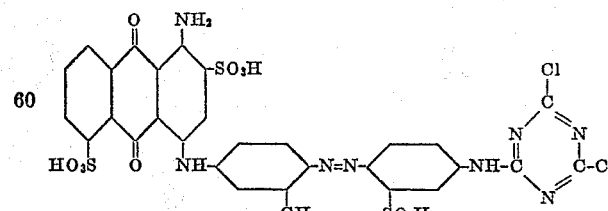

5. The dyestuff of the formula:

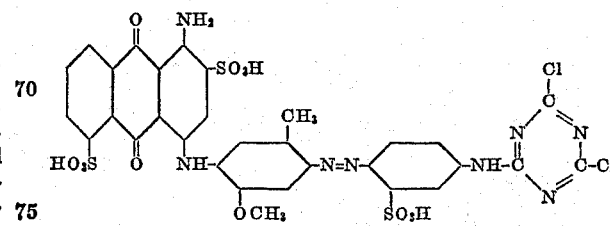

6. The dyestuff of the formula:
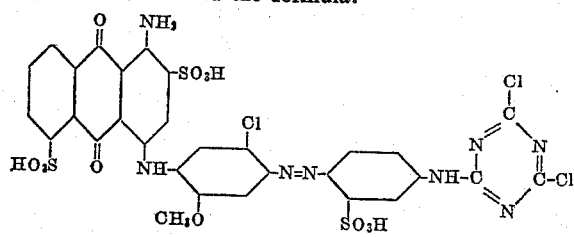
References Cited in the file of this patent
UNITED STATES PATENTS
| | | | |
|---|---|---|---|
| 1,886,480 | Haller et al. | | Nov. 8, 1932 |
| 2,108,126 | Honold et al. | | Feb. 15, 1938 |
| 2,145,954 | Semple et al. | | Feb. 7, 1939 |
| 2,892,670 | Alsberg et al. | | June 30, 1959 |
OTHER REFERENCES
Sommer: "American Dyestuff Reporter," vol. 47, No. 25, Dec. 15, 1958, pp. 895–899.